United States Patent
Lee et al.

(10) Patent No.: US 7,764,948 B2
(45) Date of Patent: Jul. 27, 2010

(54) SYSTEM AND METHOD FOR AUTHENTICATION IN A COMMUNICATION SYSTEM

(75) Inventors: Ji-Cheol Lee, Yongin-si (KR); Hyoung-Kyu Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 564 days.

(21) Appl. No.: 11/803,267

(22) Filed: May 14, 2007

(65) Prior Publication Data
US 2007/0275716 A1    Nov. 29, 2007

(30) Foreign Application Priority Data
May 13, 2006    (KR) .................. 10-2006-0043184

(51) Int. Cl.
*H04M 1/66* (2006.01)
(52) U.S. Cl. ............... 455/410; 455/411; 455/432.1
(58) Field of Classification Search ............... None
See application file for complete search history.

(56) References Cited

U.S. PATENT DOCUMENTS

| | | | |
|---|---|---|---|
| 6,418,130 B1 | 7/2002 | Cheng et al. | |
| 2002/0169958 A1 | 11/2002 | Nyman et al. | |
| 2003/0091013 A1 | 5/2003 | Song et al. | |
| 2006/0104247 A1* | 5/2006 | Dommety et al. | 370/338 |
| 2007/0091843 A1* | 4/2007 | Patel et al. | 370/331 |
| 2007/0260885 A1* | 11/2007 | Yegani et al. | 713/171 |

FOREIGN PATENT DOCUMENTS

| | | |
|---|---|---|
| EP | 1439667 | 7/2004 |
| KR | 1020030017194 | 3/2003 |
| KR | 1020030026436 | 4/2003 |
| KR | 1020060041044 | 5/2006 |

OTHER PUBLICATIONS

Lior et al., Mobile IP Key Derivation Using EAP, Feb. 25, 2006.
Floroiu et al., Security Framework for the Access Control of MIPv6 Mobile Nodes, Nov. 2002.

* cited by examiner

*Primary Examiner*—Erika A Gary
(74) *Attorney, Agent, or Firm*—The Farrell Law Firm, LLP (57) ABSTRACT

An authentication system and method in a communication system are provided. The authentication system includes an authenticator for receiving from a first Foreign Agent (FA) a location change notification notifying that an Mobile Station (MS) has moved to the service area of the first FA, after the MS completes initial access to a second FA using an authentication scheme with an Authorization, Authentication and Accounting (AAA) server in the service area of the second FA; and transmitting to the first FA a first key and a second key of the MS generated during the initial access of the MS in response to the location change notification.

14 Claims, 10 Drawing Sheets

SYSTEM AND METHOD FOR AUTHENTICATION IN A COMMUNICATION SYSTEM

PRIORITY

This application claims priority under 35 U.S.C. §119(a) to a Korean Patent Application filed in the Korean Intellectual Property Office on May 13, 2006 and assigned Serial No. 2006-43184, the disclosure of which is incorporated herein by reference.

BACKGROUND OF THE INVENTION

1. Field of the Invention

The present invention generally relates to a communication system, and in particular, to an authentication system and method in a communication system.

2. Description of the Related Art

Provisioning of a service capable of transmitting a large amount of data to Mobile Stations (MSs) at high rates is an active study area in communication systems technology. In particular, Mobile Internet Protocol (MIP) is currently being studied where allocating MIP addresses to the MSs is being considered in order to provide for a more stable high-speed-large-data transmission service, while ensuring mobility of the MSs. However, because the MSs that do not support MIP cannot receive the MIP-based service, Proxy MIP (PMIP) has been proposed to enable the MSs to receive the same service as the MIP-based service. For notational simplicity, a communication system using MIP is called an MIP communication system and a communication system using PMIP is called a PMIP communication system.

Efforts have been made to develop authentication schemes for authenticating MSs in the MIP and PMIP communication systems. The authentication schemes are largely categorized into device authentication, device-user authentication, and user authentication. The device-user authentication scheme authenticates a device and a user by a single Extensible Authentication Protocol (EAP) or a double EAP.

Despite these active studies concerning authentication in the MIP and PMIP communication systems, there are no specified authentication schemes. Accordingly, there exists a need for a method for authenticating MSs, such that signaling overhead is minimized in both the MIP and PMIP communication systems.

SUMMARY OF THE INVENTION

An aspect of the present invention is to substantially solve at least the above problems and/or disadvantages and to provide at least the advantages described below. Accordingly, one aspect of the present invention is to provide an authentication system and method in a communication system.

Moreover, another aspect of the present invention is to provide a system and method for authenticating MSs with minimal signaling overhead in a communication system.

According to another aspect of the present invention, there is provided an authentication system in a communication system. The system includes an MS; a second FA for transmitting a location change notification to an authenticator, upon detection of the MS's movement to the service area of the second FA after the MS completes initial access to a first FA using an authentication scheme with an AAA server in the service area of the first FA and receives from the authenticator a first key and a second key of the MS generated during the initial access of the MS; and the authenticator transmits the first key and the second key in response to the location change notification.

According to another aspect of the present invention, there is provided an authentication method of an authenticator in a communication system. The method includes the authenticator receiving from a first FA a location change notification notifying that an MS has moved to the service area of the first FA, after the MS completes initial access to a second FA using an authentication scheme with an AAA server in the service area of the second FA; and transmitting to the first FA a first key and a second key of the MS generated during the initial access of the MS in response to the location change notification.

According to a further aspect of the present invention, there is provided an authentication method of a second FA in a communication system. The method includes the second FA transmitting a location change notification to an authenticator, upon detection of an MS's movement to the service area of the second FA after the MS completes initial access to a first FA using an authentication scheme with an AAA server in the service area of the first FA; and receiving from the authenticator a first key and a second key of the MS generated during the initial access of the MS.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an authentication system and method for a communication system such as a CMIP communication system and a PMIP communication system. CMIP refers to a general MIP, named so just to be distinguished from PMIP. For convenience' sake, it is assumed that the CMIP communication system operates in compliance with CMIP version 4 (CMIPv4) and the PMIP communication system operates in compliance with PMIPv4.

Figure 1:
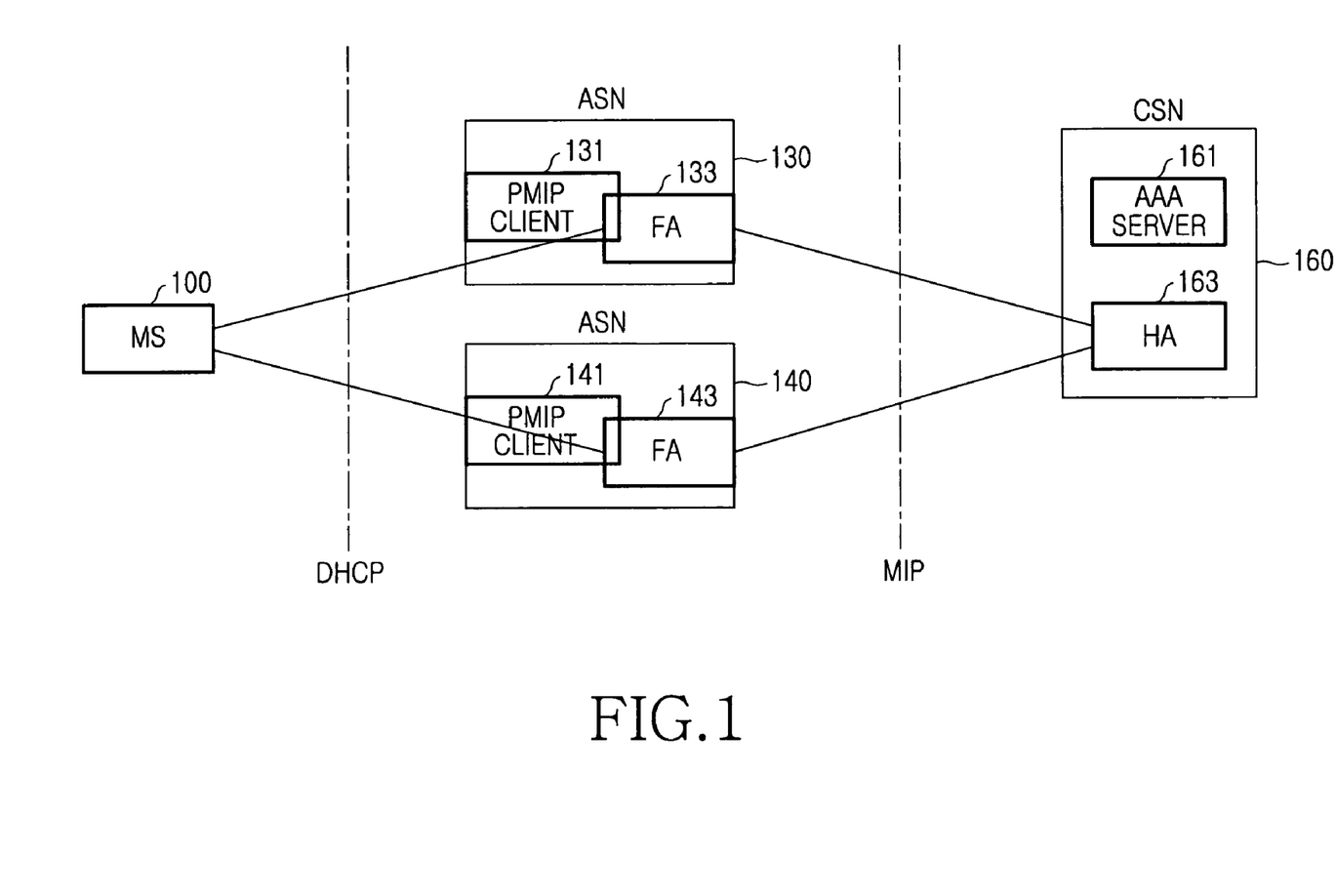
FIG. 1 illustrates the configuration of a PMIP version 4 (PMIPv4) communication system according to an exemplary embodiment of the present invention.

FIG. 1 illustrates the configuration of a PMIP version 4 (PMIPv4) communication system according to an exemplary embodiment of the present invention.

In FIG. 1, the PMIPv4 communication system includes an MS 100, Access Service Networks (ASNs) 130 and 140, and a Core Service Network (CSN) 160. The ASN 130 has a PMIP client 131 and an FA 133, and the ASN 140 has a PMIP client 141 and an FA 143. The CSN 160 includes an Authorization, Authentication, and Accounting (AAA) server 161 and a Home Agent (HA) 163.

The MS 100 is not MIP-enabled and supports Dynamic Host Configuration Protocol (DHCP). Thus, the MS 100 includes a DHCP client. Because the MS 100 does not support MIP, the PMIP clients 131 and 141 are functional entities that perform MIP-related operations on behalf of the MS 100. For managing a Mobile Node (MN)-HA key, the PMIP clients 131 and 141 should reside together with an authenticator in the same entity. Herein, the terms "MN" and "MS" are interchangeably used in the same meaning.

Furthermore, in FIG. 1, authenticators for the MS 100 are provided at the FAs 133 and 143 and thus the PMIP clients 131 and 141 reside in the FAs 133 and 143, respectively. In the PMIPv4 communication system, signaling is carried out between the MS 100 and the FAs 133 and 143 by DHCP and signaling is based on MIP between the HA 163 and the FAs 133 and 143.

Figure 2:
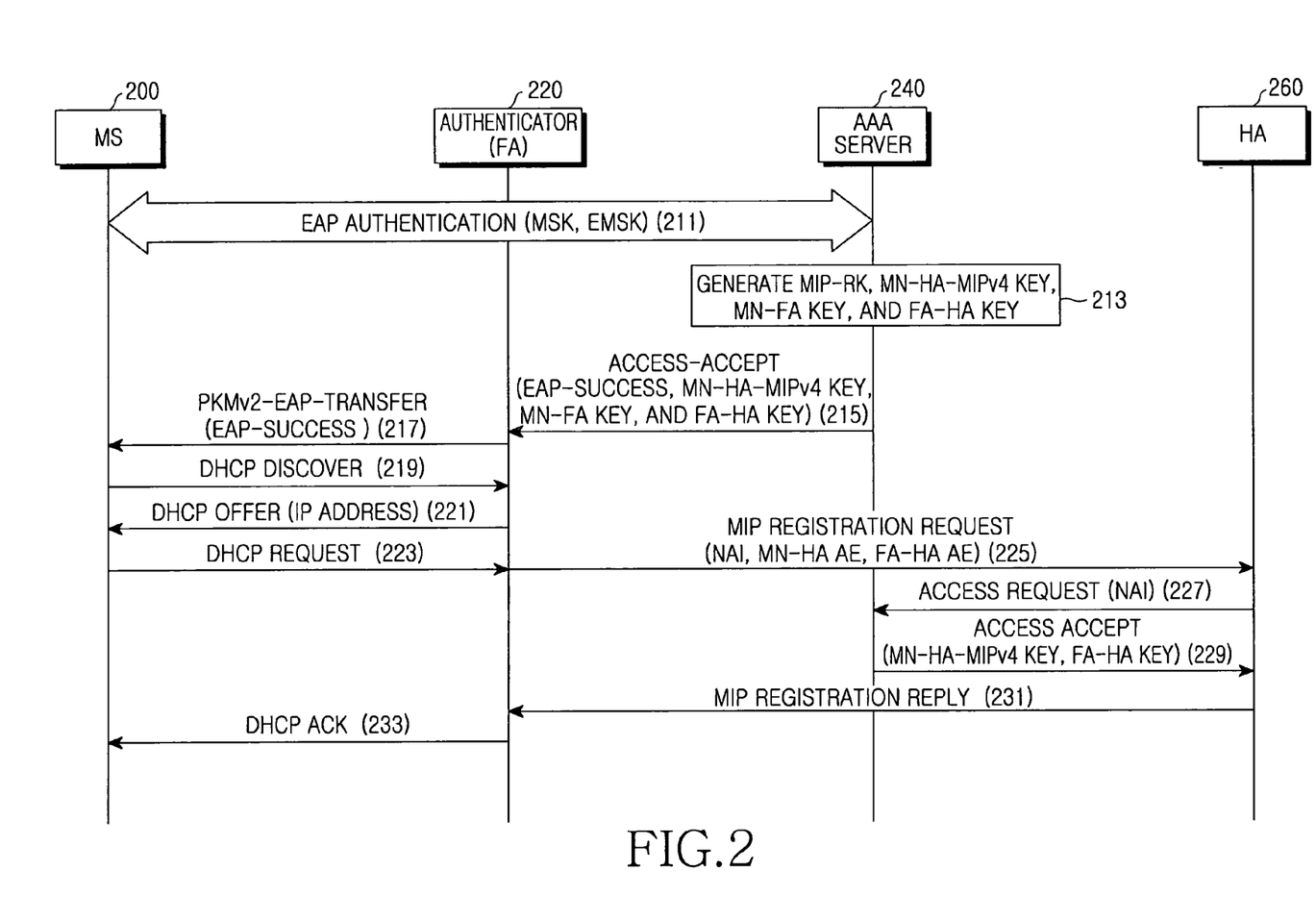
FIG. 2 is a diagram illustrating a signal flow for an authentication procedure in case of an MS's initial access in a PMIPv4 communication system according to another exemplary embodiment of the present invention.

FIG. 2 is a diagram illustrating a signal flow for an authentication procedure in case of an MS's initial access in a PMIPv4 communication system according to another exemplary embodiment of the present invention. In the illustrated case of FIG. 2, signaling is performed by Remote Authentication Dial-In User Service (RADIUS) between an Authenticator (FA) 220 and an AAA server 240, between the AAA server 240 and an HA 260, and between the Authenticator (FA) 220 and the HA 260. Privacy Key Management version 2 (PKMv2) is used for signaling between an MS 200 and the authenticator (FA) 220. Because an authenticator and an FA reside in the same entity, the authenticator (FA) 220 is so named.

In FIG. 2, an EAP authentication takes place among the MS 200, the authenticator (FA) 220, and the AAA server 240 and as a result, a Master Session Key (MSK) and an Extended Master Session Key (EMSK) are shared among them in step 211. The AAA server 240 creates an MIP-Route Key (MIP-RK) using the EMSK and further creates an MN-HA-MIPv4 key, an MN-FA key, and an FA-HA key using the MIP-RK in step 213. The MN-HA-MIPv4 key is generated according to Equation (1):

$$\text{MN-HA-MIPv4} = H(\text{MIP-RK}, \text{"MN-HA-MIPv4"} | \text{HA-IP}) \quad (1)$$

where MN-HA-MIPv4 denotes the MN-HA-MIPv4 key, MIP-RK denotes the MIP-RK, "MN-HA-MIP4" denotes a string indicating that a key generated by the function H is the MN-HA-MIP4 key, and HA-IP denotes the IP address of the HA 260. The function H expressed in Equation (1) generates the MN-HA-MIPv4 key for the input of a parameter formed by concatenating the MIP-RK, the string MN-HA-MIPv4, and the HA-IP.

The MN-FA key is created according to Equation (2):

$$\text{MN-FA} = H(\text{MIP-RK}, \text{"MN-FA"} | \text{FA-IP}) \quad (2)$$

where MN-FA denotes the MN-FA key, "MN-FA" denotes a string indicating that a key generated by the function H is the MN-FA key, and FA-IP denotes the IP address of the authenticator (FA) 220. That is, the function H expressed in Equation (2) generates the MN-FA key for the input of a parameter formed by concatenating the MIP-RK, the string MN-FA, and the FA-IP.

The FA-HA key is created according to Equation (3):

$$\text{FA-HA} = H(\text{MIP-RK}, \text{"FA-HA"} | \text{FA-IP} | \text{HA-IP} | \text{NONCE}) \quad (3)$$

where FA-HA denotes the FA-HA key, "FA-HA" denotes a string indicating that a key generated by the function H is the FA-HA key, and NONCE denotes a parameter used for authentication in the PMIPv4 communication system.

The AAA server 240 transmits to the Authenticator (FA) 220 an ACCESS-ACCEPT message with an EAP-SUCCESS message indicating successful EAP authentication, the MN-HA-MIPv4 key, the MN-FA key, the FA-HA key, and an IP address that the AAA server 240 allocates to the MS 200 in step 215. Upon receipt of the ACCESS-ACCEPT message, the Authenticator (FA) 220 transmits a PKMv2-EAP-TRANSFER message including the EAP-SUCCESS message to the MN 200 in step 217.

In step 219, the MS 200 transmits a DHCP DISCOVER message to the Authenticator (FA) 220. The Authenticator (FA) 220 transmits to the MS 200 a DHCP OFFER message with the IP address allocated to the MS 200 in step 221. The MS 200 transmits a DSCP REQUEST message confirming the IP address included in the DHCP OFFER message to the Authenticator (FA) 220 in step 223.

In step 225, the Authenticator (FA) 220 transmits an MIP REGISTRATION REQUEST message to the HA 260. The MIP REGISTRATION REQUEST message contains a Network Access Identifier (NAI) of the MS 200, an MN-HA Authentication Extension (MN-HA AE), and an FA-HA Authentication Extension (FA-HA AE). The MN-HA AE is created using the MN-HA-MIPv4 key and the FA-HA AE is generated using the FA-HA key.

Upon receipt of the MIP REGISTRATION REQUEST message from the Authenticator (FA) 220, the HA 260 transmits an ACCESS REQUEST message to the AAA server 240 to acquire keys needed for authenticating the MS 200 in step 227. The ACCESS REQUEST message includes the NAI of the MS 200. In step 229, the AAA server 240 transmits an ACCESS ACCEPT message with the MN-HA-MIPv4 key and the FA-HA key for the MS 200 to the HA 260. The HA 260 authenticates the MS 200 using the MN-HA-MIPv4 key and the FA-HA key and transmits an MIP REGISTRATION REPLY message to the Authenticator (FA) 220 in response to the MIP REGISTRATION REQUEST message in step 231. In step 233, the Authenticator (FA) 220 replies to the MS 200 with a DHCP ACK message for the DHCP REQUEST message received from the MS 200.

While it has been described above that the MIP registration of steps 225 to 231 occurs after the Authenticator (FA) 220 receives the DHCP REQUEST message from the MS 200, the MIP registration can be performed after the Authenticator (FA) 220 receives the DHCP DISCOVER message from the MS 200.

Figure 3:
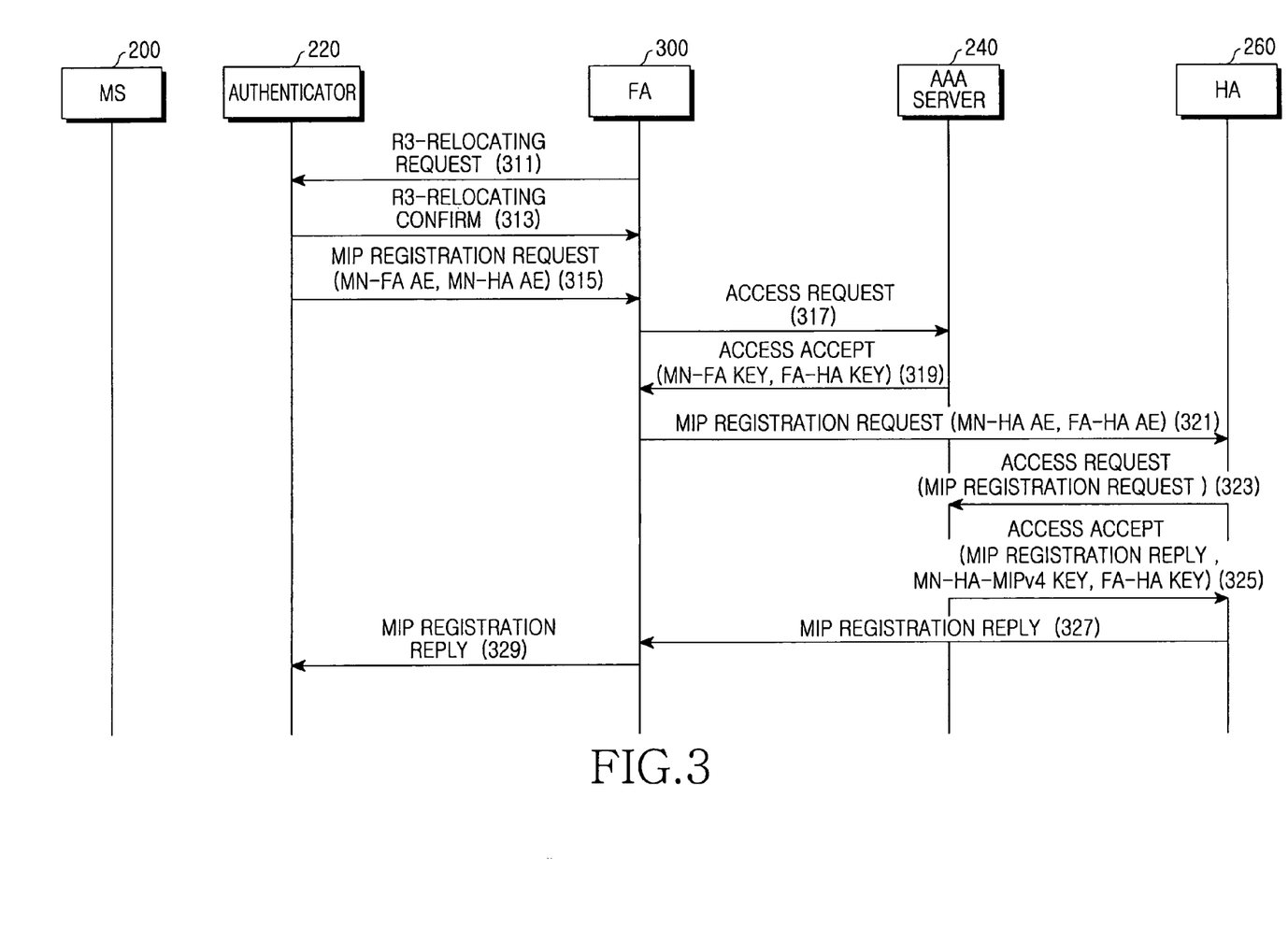
FIG. 3 is a diagram illustrating a signal flow for an authentication procedure in the case where the MS moves out of a Foreign Agent (FA) to which the MS initially accessed by the procedure illustrated in FIG. 2 and enters the service area of another FA.

FIG. 3 is a diagram illustrating a signal flow for an authentication procedure where the MS moves out of an FA to which the MS initially accessed by the procedure illustrated in FIG. 2 and enters the service area of another FA. In the illustrated case of FIG. 3, signaling is performed by RADIUS among the Authenticator 220, a FA 300, and the AAA server 240, between the AAA server 240 and the HA 260, and between the FA 300 and the HA 260. For signaling between the MS 200 and the FA 300, PKMv2 is used.

In FIG. 3, when the MS 200 completes its initial access and moves from the old FA to which the MS 200 initially accessed to the new FA 300, the FA 300 transmits an R3-RELOCATING REQUEST message indicating the change of the location of the MS 200 to the old authenticator 220 in step 311. In step 313, the Authenticator 220 replies to the FA 300 with an R3-RELOCATING CONFIRM message.

In addition, the Authenticator 220 transmits an MIP REGISTRATION REQUEST message with the MN-FA AE and the MN-HA AE to the FA 300 in step 315. The MN-FA AE is generated using the MN-FA key. Upon receipt of the MIP REGISTRATION REQUEST message, the FA 300 queries the AAA server 240 about the MN-FA key and the FA-HA key by an ACCESS REQUEST message because it does not manage the MN-FA key and the FA-HA key in step 317. The AAA server 240 then transmits the MN-FA key and the FA-HA key to the FA 300 by an ACCESS ACCEPT message in step 319 and the FA 300 transmits to the HA 260 an MIP REGISTRATION REQUEST message with the MN-HA AE and the FA-HA AE in step 321.

The HA 260 transmits an ACCESS REQUEST message including the MIP REGISTRATION REQUEST message to the AAA server 240 in order to acquire keys needed for authenticating the MS 200 in step 323. In step 325, the AAA server 240 transmits an ACCESS ACCEPT message including the MN-HA-MIPv4 key and the FA-HA key for the MS 200 and including an MIP REGISTRATION REPLY message to the HA 260. If the HA 260 already manages the MN-HA-MIPv4 key, it does not need to request and receive the MN-HA-MIPv4 key.

The HA 260 authenticates the MS 200 using the MN-HA-MIPv4 key and the FA-HA key and transmits an MIP REGISTRATION REPLY message to the FA 300 in response to the MIP REGISTRATION REQUEST message in step 327. In step 329, the FA 300 replies to the MS 200 with an MIP REGISTRATION REPLY message for the MIP REGISTRATION REQUEST message received from the MS 200. Notably, the R3-RELOCATING REQUEST message and the R3-RELOCATING CONFIRM message are newly defined in the PMIPv4 communication system.

As described above, when the MS moves from the initially-accessed FA to the new FA, the new FA requests the MN-FA key and the FA-HA key of the MS to the AAA server and receives the MN-FA key and the MN-FA key in steps 317 and 319 because it does not manage the MN-FA key and the FA-HA key. The request and reception of the MN-FA key and the FA-HA key at each time when the MS moves to another FA increases the overall signaling overhead of the PMIPv4 communication system.

Figure 4:
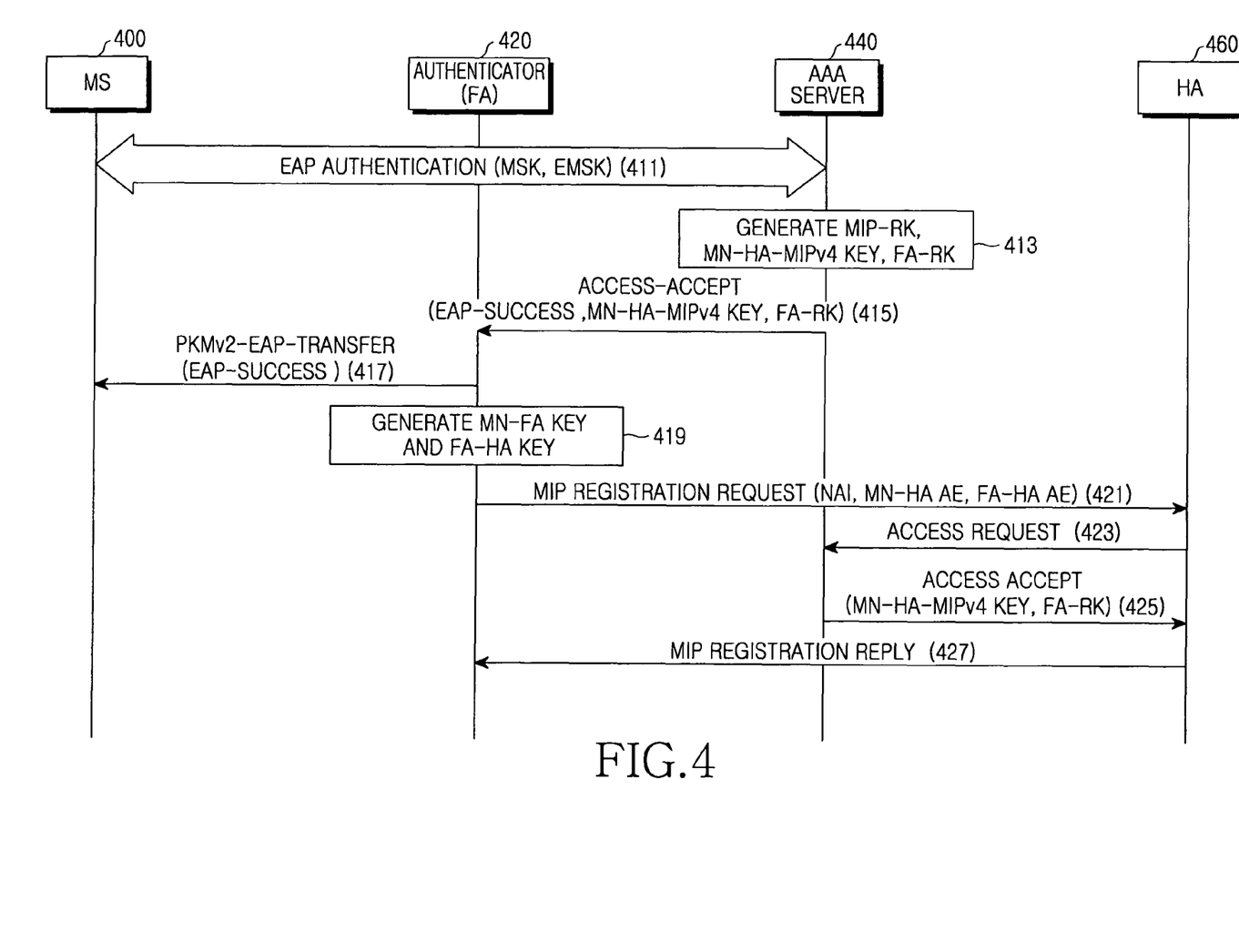
FIG. 4 is a diagram illustrating a signal flow for an authentication procedure in case of an MS's initial access in a PMIPv4 communication system according to an exemplary embodiment of the present invention.

FIG. 4 is a diagram illustrating a signal flow for an authentication procedure in case of an MS's initial access in a PMIPv4 communication system according to another exemplary embodiment of the present invention. In the illustrated case of FIG. 4, signaling is performed by RADIUS between an Authenticator (FA) 420 and an AAA server 440, between the AAA server 440 and an HA 460, and between the Authenticator (FA) 420 and the HA 460. PKMv2 is used for signaling between an MS 400 and the Authenticator (FA) 420. Because an authenticator and an FA reside in the same entity, the Authenticator (FA) 420 is so named.

In FIG. 4, an EAP authentication takes place among the MS 400, the Authenticator (FA) 420, and the AAA server 440 and as a result, a MSK and an EMSK are shared among the MS 400, the Authenticator (FA) 420, and the AAA server 440 in step 411. The AAA server 440 creates an MIP-RK using the EMSK and further creates an MN-HA-MIPv4 key and an FA-RK using the MIP-RK in step 413. The MN-HA-MIPv4 key is generated by Equation (1) and the FA-RK is generated according to Equation (4):

$$FA\text{-}RK = H(MIP\text{-}RK, \text{``FA-RK''}) \qquad (4)$$

where "FA-RK" denotes a string indicating that a key generated by the function H is the FA-RK. That is, the function H expressed in Equation (4) generates the FA-RK for the input of the MIP-RK and the string FA-RK as input parameters.

Alternatively, the FA-RK is generated according to Equation (5):

$$FA\text{-}RK = H(MIP\text{-}RK, \text{``FA-RK''}|Authenticator\text{-}ID) \qquad (5)$$

where "FA-RK" denotes the string indicating that a key generated by the function H is the FA-RK and Authentication-ID denotes an Identifier (ID) of the Authenticator (FA) 420. That is, the function H expressed in Equation (5) generates the FA-RK for the input of the MIP-RK, the string FA-RK, and the Authentication-ID as input parameters.

The AAA server 440 transmits to the Authenticator (FA) 420 an ACCESS-ACCEPT message with an EAP-SUCCESS message indicating successful EAP authentication, the MN-HA-MIPv4 key, the FA-RK, and an IP address that the AAA server 440 allocates to the MS 400 in step 415. Upon receipt of the ACCESS-ACCEPT message, the Authenticator (FA) 420 transmits a PKMv2-EAP-TRANSFER message including the EAP-SUCCESS message to the MN 400 in step 417.

In step 419, the Authenticator (FA) 420 generates an MN-FA key and an FA-HA key using the FA-RK after transmitting the PKMv2-EAP-TRANSFER message. The MN-FA key is generated according to Equation (6):

$$MN\text{-}FA = H(FA\text{-}RK, \text{``MN-FA''}|FA\text{-}IP) \qquad (6)$$

where "MN-FA" denotes a string indicating that a key generated by the function H is the MN-FA key, and FA-IP denotes the IP address of the Authenticator (FA) 420. That is, the function H expressed in Equation (6) generates the MN-FA key for the input of a parameter formed by concatenating the FA-RK, the string MN-FA, and the FA-IP.

The FA-HA key is created according to Equation (7):

$$FA\text{-}HA = H(FA\text{-}RK, \text{``FA-HA''}|FA\text{-}IP|HA\text{-}IP) \qquad (7)$$

where "FA-HA" denotes a string indicating that a key generated by the function H is the FA-HA key, FA-IP denotes the IP address of the Authenticator (FA) 420, and HA-IP denotes the IP address of the HA 460. That is, the H function described as Equation (7) generates the FA-HA key for the input of a parameter formed by concatenating the FA-RK, the string FA-HA, the FA-IP, and the HA-IP.

In step 421, the Authenticator (FA) 420 transmits an MIP REGISTRATION REQUEST message to the HA 460. The MIP REGISTRATION REQUEST message contains a NAI of the MS 400, an MN-HA AE, and an FA-HA AE. Upon receipt of the MIP REGISTRATION REQUEST message from the Authenticator (FA) 420, the HA 460 transmits an ACCESS REQUEST message to the AAA server 440 to acquire keys needed for authenticating the MS 400 in step 423. In step 425, the AAA server 440 transmits an ACCESS ACCEPT message with the MN-HA-MIPv4 key and the FA-RK for the MS 400 to the HA 460. The HA 460 authenticates the MS 400 using the MN-HA-MIPv4 key and the FA-RK and transmits an MIP REGISTRATION REPLY message to the Authenticator (FA) 420 in response to the MIP REGISTRATION REQUEST message in step 427.

Figure 5:
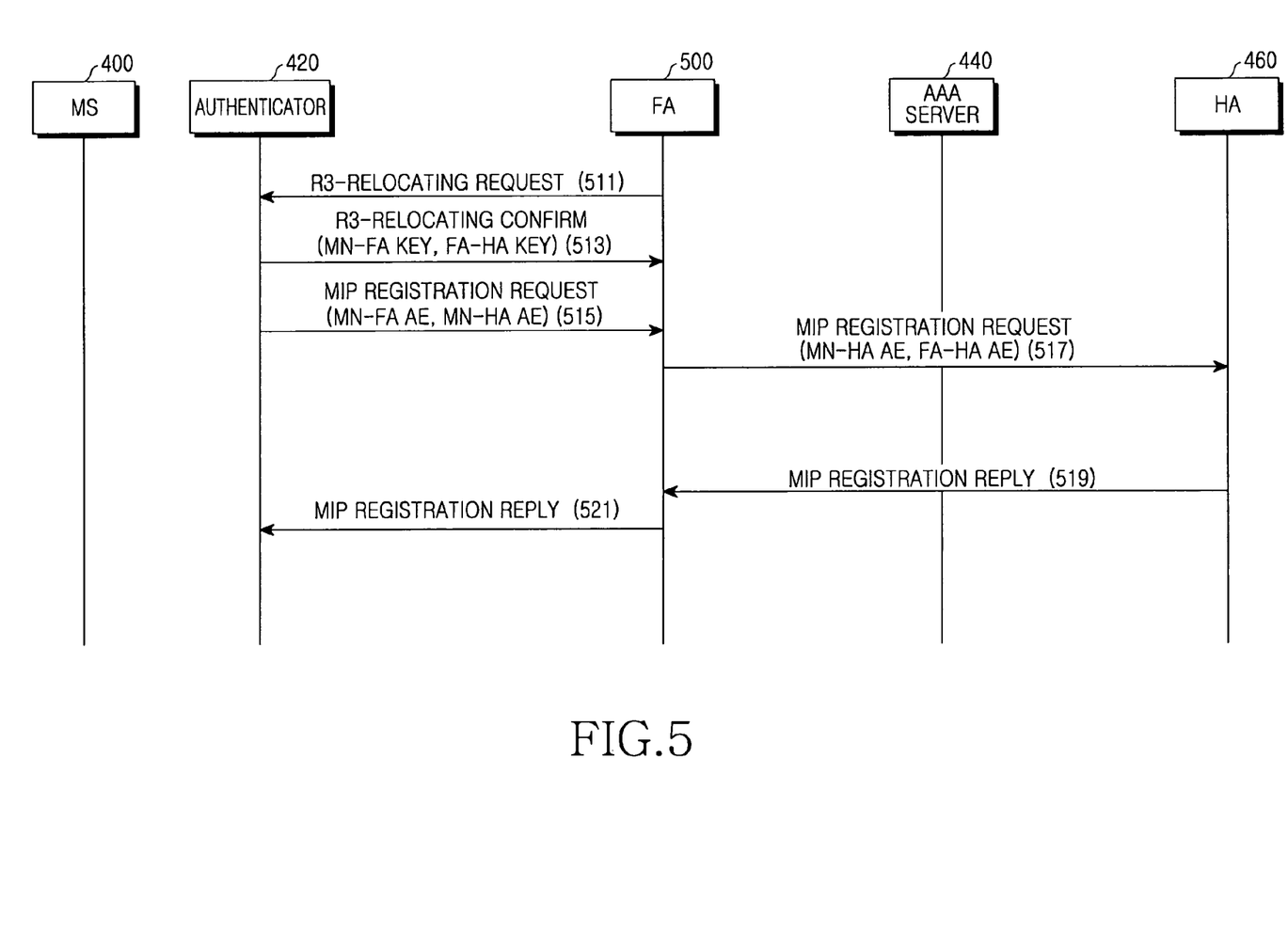
FIG. 5 is a diagram illustrating a signal flow for an authentication procedure in the case where the MS moves out of an FA to which the MS initially accessed by the procedure illustrated in FIG. 4 and enters the service area of another FA.

FIG. 5 is a diagram illustrating a signal flow for an authentication procedure in the case where the MS moves out of an FA to which the MS initially accessed by the procedure illustrated in FIG. 4 and enters the service area of another FA. In the illustrated case of FIG. 5, signaling is performed by RADIUS among the authenticator 420, an FA 500, and the AAA server 440, between the AAA server 440 and the HA 460, and between the FA 500 and the HA 460. For signaling between the MS 400 and the FA 500, PKMv2 is used.

In FIG. 5, when the MS 400 completes its initial access and then moves from the old FA to which the MS 400 initially accessed to the new FA 500, the FA 500 transmits an R3-RELOCATING REQUEST message indicating the change of the location of the MS 400 to the old authenticator 420 in step 511. In step 513, the authenticator 420 replies to the FA 500 with an R3-RELOCATING CONFIRM message containing the MN-FA key and the FA-HA key.

The Authenticator (FA) 420 transmits an MIP REGISTRATION REQUEST message with the MN-FA AE and the MN-HA AE to the FA 500 in step 515. Upon receipt of the MIP REGISTRATION REQUEST message, the FA 500 transmits an MIP REGISTRATION REQUEST message with the MN-HA AE and the FA-HA AE to the HA 460 in step 517. Because the FA 500 has already received the MN-FA key and the FA-HA key by the R3-RELOCATING CONFIRM message, FA 500 does not need to request and receive the MN-FA key and the FA-HA key to the AAA server 440, thereby avoiding the signaling overhead imposed by the transmission request and reception of the MN-FA key and the FA-HA key. The HA 460 authenticates the FA-HA AE by creating the FA-HA key using the FA-RK that it manages and transmits an MIP REGISTRATION REPLY message corresponding to the authentication result to the FA 500 in response to the MIP REGISTRATION REQUEST message in step 519. In step 521, the FA 500 replies to the MS 400 with an MIP REGISTRATION REPLY message for the MIP REGISTRATION REQUEST message received from the MS 400.

As described above, even though the MS moves from the initially-accessed FA to the new FA, the new FA can receive the MN-FA key and the FA-HA key of the MS from the old authenticator. Therefore, the signaling overhead from the MS authentication in case of an FA change is minimized.

Figure 6:
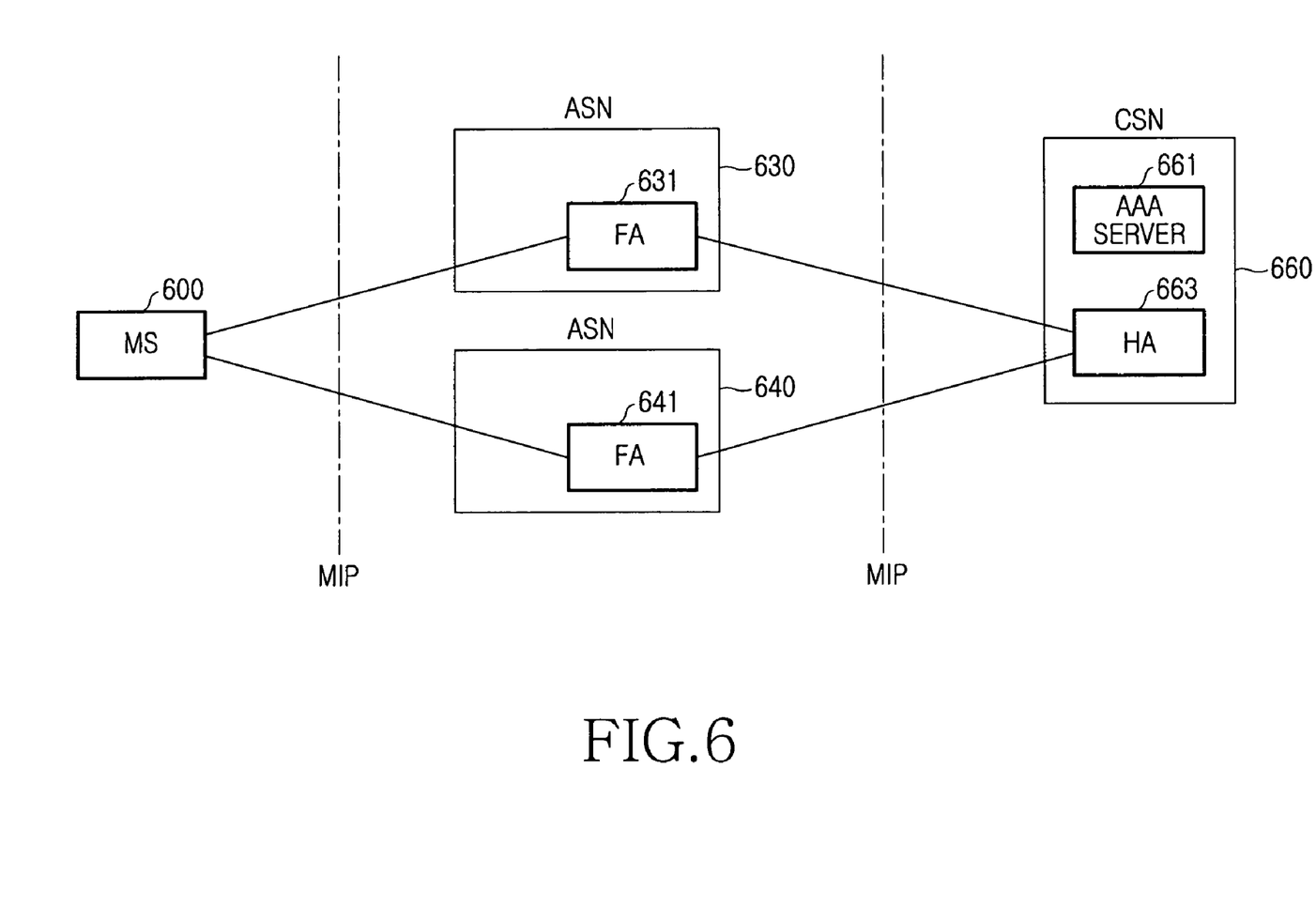
FIG. 6 is a block diagram of the configuration of a Client MIP version 4 (CMIPv4) communication system according to an exemplary embodiment of the present invention.

FIG. 6 is a block diagram of the configuration of a CMIPv4 communication system according to an exemplary embodiment of the present invention.

In FIG. 6, the CMIPv4 communication system includes an MS 600, ASNs 630 and 640, and a CSN 660. The ASN 630 has an FA 633, and the ASN 640 has an FA 643. The CSN 660 is provided with an AAA server 661 and an HA 663. The MS 600 is MIP-enabled. Thus, signaling is carried out by MIP between the MS 600 and the FAs 633 and 643 and between the FAs 633 and 643 and the HA 663.

Figure 7:
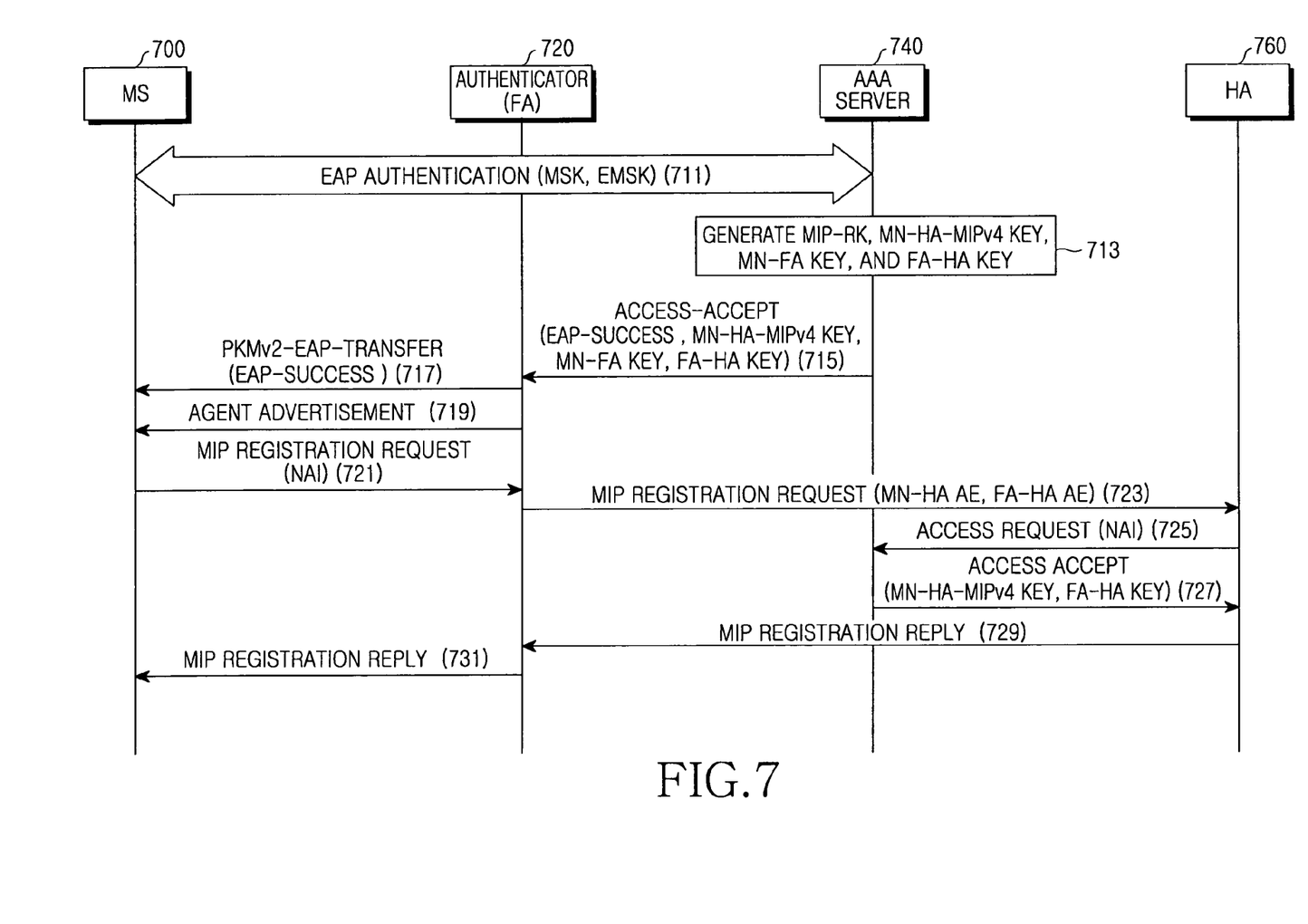
FIG. 7 is a diagram illustrating a signal flow for an authentication procedure in case of an MS's initial access in a CMIPv4 communication system according to an exemplary embodiment of the present invention.

FIG. 7 is a diagram illustrating a signal flow for an authentication procedure in case of an MS's initial access in a CMIPv4 communication system according to a fifth exemplary embodiment of the present invention. In the illustrated case of FIG. 7, signaling is performed by RADIUS between an Authenticator (FA) 720 and an AAA server 740, between the AAA server 740 and an HA 760, and between the Authenticator (FA) 720 and the HA 760. PKMv2 is used for signaling between an MS 700 and the Authenticator (FA) 720. Because an authenticator and an FA reside in the same entity, the Authenticator (FA) 720 is so named. Steps 711 to 717 are performed almost in the same manner as steps 211 to 217 illustrated in FIG. 2 and thus their detailed description is not provided herein.

In FIG. 7, the Authenticator (FA) 720 transmits an AGENT ADVERTISEMENT message to the MS 700 after transmitting a PKMv2-EAP TRANSFER message in step 719. The MS 700 then transmits an MIP REGISTRATION REQUEST message to the Authenticator (FA) 720 in step 721. The MIP REGISTRATION REQUEST message includes a NAI of the MS 700. Steps 723 to 729 are almost the same as steps 225 to 231 of FIG. 2 and thus they will not be described in detail herein. Upon receipt of an MIP REGISTRATION REPLAY message from the AAA server 740, the Authenticator (FA) 720 transmits an MIP REGISTRATION REPLY message to the MS 700 in step 731.

Figure 8:
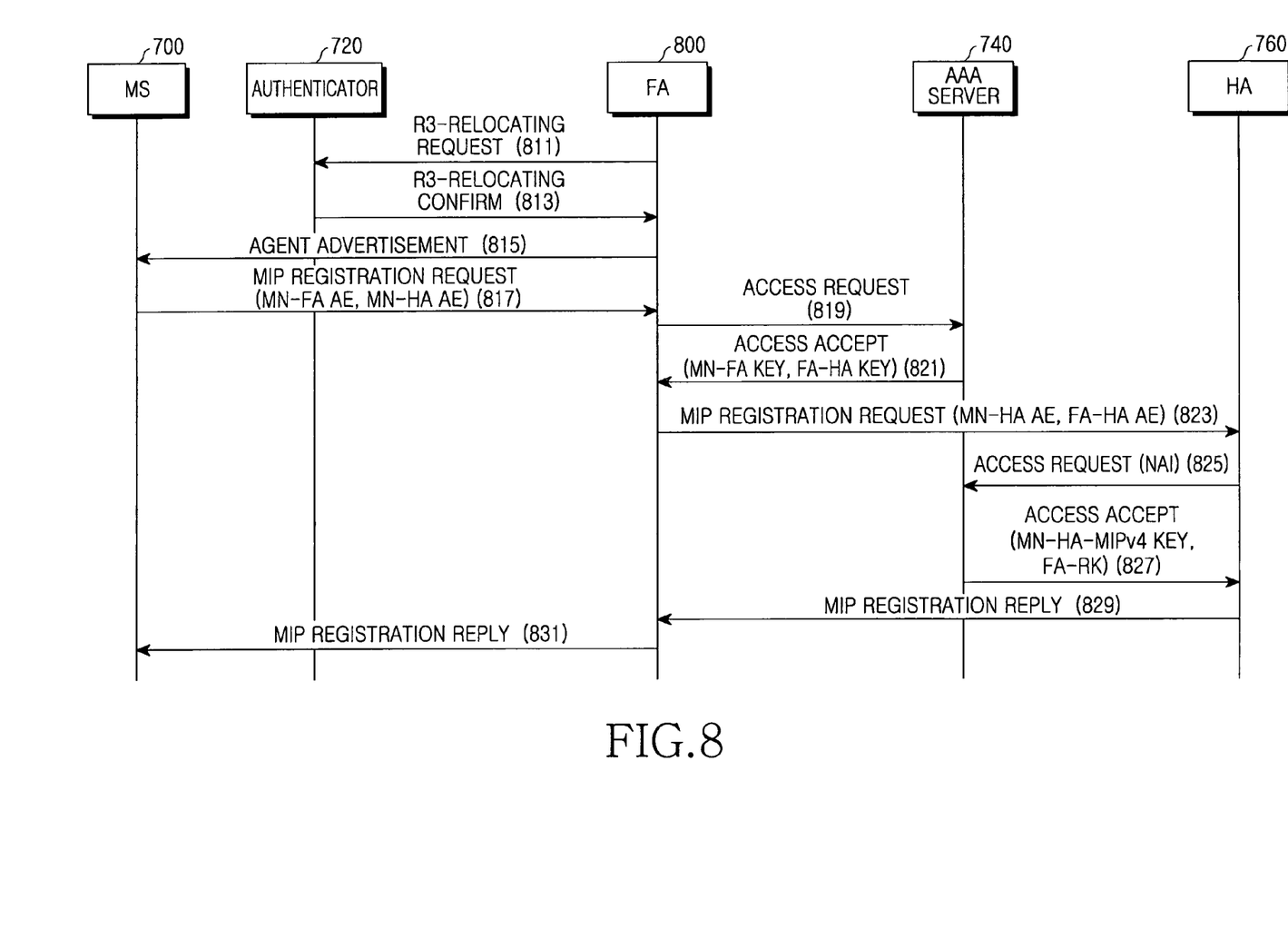
FIG. 8 is a diagram illustrating a signal flow for an authentication procedure in the case where the MS moves out of an FA to which the MS initially accessed by the procedure illustrated in FIG. 7 and enters the service area of another FA.

FIG. 8 is a diagram illustrating a signal flow for an authentication procedure in the case where the MS moves out of an FA to which the MS initially accessed by the procedure illustrated in FIG. 7 and enters the service area of another FA. In the illustrated case of FIG. 8, signaling is performed by RADIUS among the Authenticator 720, an FA 800, and the AAA server 740, between the AAA server 740 and the HA 760, and between the FA 800 and the HA 860. For signaling between the MS 700 and the FA 900, PKMv2 is used.

In FIG. 8, when the MS 700 completes its initial access and moves from the old FA to which the MS 700 initially accessed to the new FA 800, the FA 700 transmits an R3-RELOCATING REQUEST message indicating the change of the location of the MS 700 to the old Authenticator 720 in step 811. In step 813, the authenticator 720 replies to the FA 800 with an R3-RELOCATING CONFIRM message.

Upon receipt of the R3-RELOCATING CONFIRM message, the FA 800 transmits an AGENT ADVERTISEMENT message to the MS 700 in step 815. IN step 817, the MS 700 transmits to the FA 800 an MIP REGISTRATION REQUEST message with an MN-HA AE and an MN-HA AE. Because the FA 800 does not manage an MN-FA key and an FA-HA key, it queries the AAA server 740 about the MN-FA key and the FA-HA key by an ACCESS REQUEST message in step 819. The AAA server 740 transmits an ACCESS ACCEPT message including the MN-FA key and the FA-HA key that it manages to the FA 800 in step 821. Then, the FA 800 transmits an MIP REGISTRATION REPLY message with the MN-HA AE and the FA-HA AE to the HA 760 in step 823.

The HA 760 transmits an ACCESS REQUEST message to the AAA server 740 to acquire keys needed for authenticating the MS 700 in step 825. The ACCESS REQUEST message contains the NAI of the MS 700. Upon receipt of the ACCESS REQUEST message, the AAA server 740 transmits to the HA 760 an ACCESS ACCEPT message including an MN-HA-IMPv4 key and an FA-RK for the MS 700 to the HA 760 in step 827. If the HA 760 already manages the MN-HA-MIPv4 key, it does not need to request and receive the MN-HA-MIPv4 key.

The HA 760 authenticates the MS 700 using the MN-HA-MIPv4 key and the FA-HA key and transmits an MIP REGISTRATION REPLY message to the FA 800 in response to the MIP REGISTRATION REQUEST message in step 829. In step 831, the FA 800 replies to the MS 700 with an MIP REGISTRATION REPLY message for the MIP REGISTRATION REQUEST message received from the MS 700.

As described above, when the MS moves from the initially-accessed FA to the new FA, the new FA requests the MN-FA key and the FA-HA key of the MS to the AAA server and receives these keys in steps 819 and 821 because it does not manage the MN-FA key and the FA-HA key. The request and reception of the MN-FA key and the FA-HA key at each time when the MS moves to another FA increases the overall signaling overhead of the CMIPv4 communication system.

Figure 9:
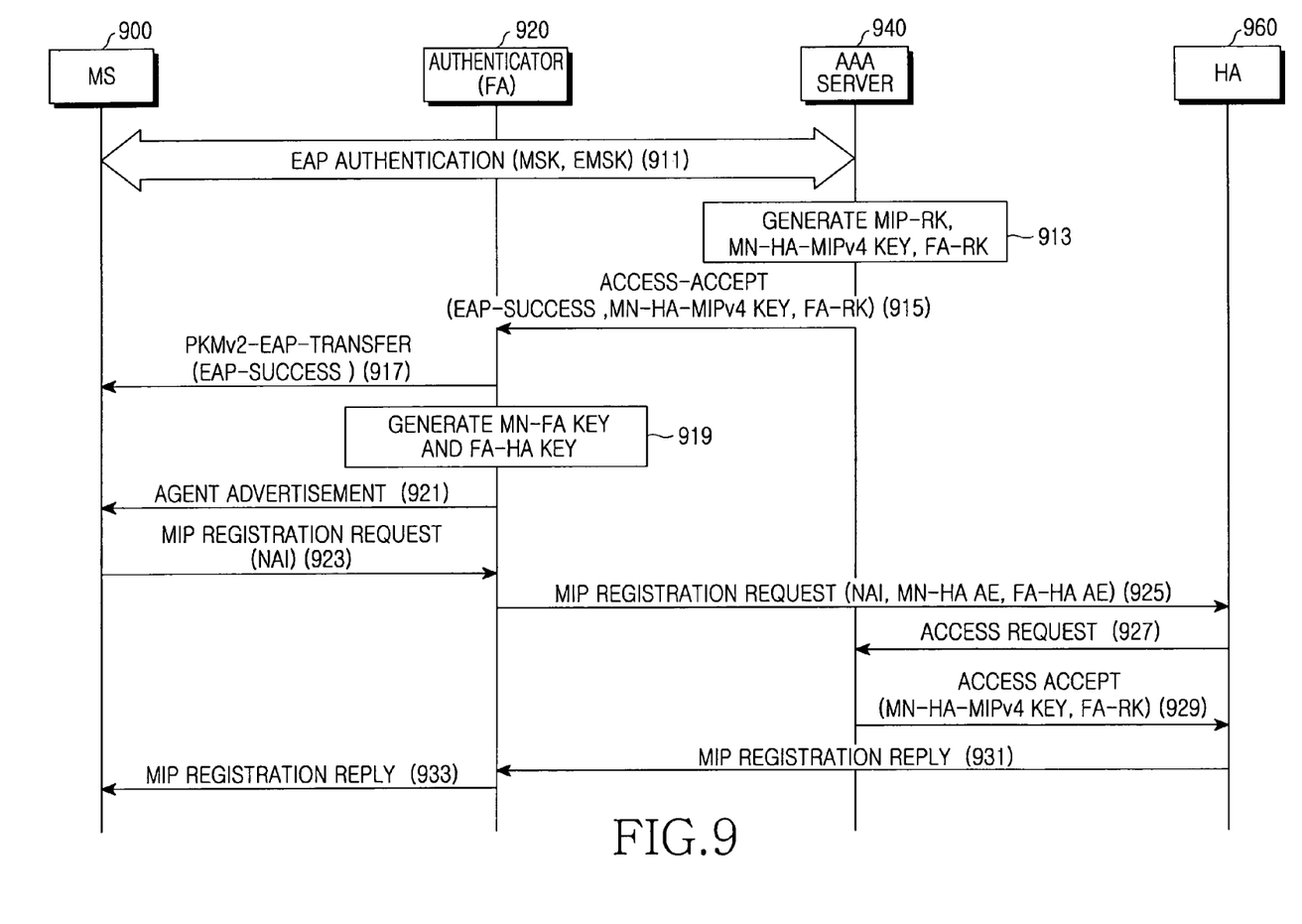
FIG. 9 is a diagram illustrating a signal flow for an authentication procedure in case of an MS's initial access in a CMIPv4 communication system according to an exemplary embodiment of the present invention.

FIG. 9 is a diagram illustrating a signal flow for an authentication procedure in case of an MS's initial access in a CMIPv4 communication system according to a sixth exemplary embodiment of the present invention. In the illustrated case of FIG. 9, signaling is performed by RADIUS between an Authenticator (FA) 920 and an AAA server 940, between the AAA server 940 and an HA 960, and between the Authenticator (FA) 920 and the HA 960. PKMv2 is used for signaling between an MS 900 and the Authenticator (FA) 920. Because an authenticator and an FA reside in the same entity, the Authenticator (FA) 420 is so named. Steps 911 to 919 are almost the same as steps 411 to 419 of FIG. 4, and steps 921 to 927 are also the same as steps 719 to 725 of FIG. 7. Thus, a description of steps 911 to 927 is not provided herein.

In FIG. 9, upon receipt of an ACCESS REQUEST message from the HA 960, the AAA server 940 transmits to the HA 960 an ACCESS-ACCEPT message with an MN-HA-MIPv4 key and an FA-RK for the MS 900 in step 929. The HA 960 authenticates the MS 900 using the MN-HA-MIPv4 key and the FA-RK and transmits an MIP REGISTRATION REPLY message to the Authenticator (FA) 920 in response to an MIP REGISTRATION REQUEST message received from the Authenticator (FA) 920 in step 931. The Authenticator (FA) 920 transmits an MIP REGISTRATION REPLY message to the MS 900 in step 933.

Figure 10:
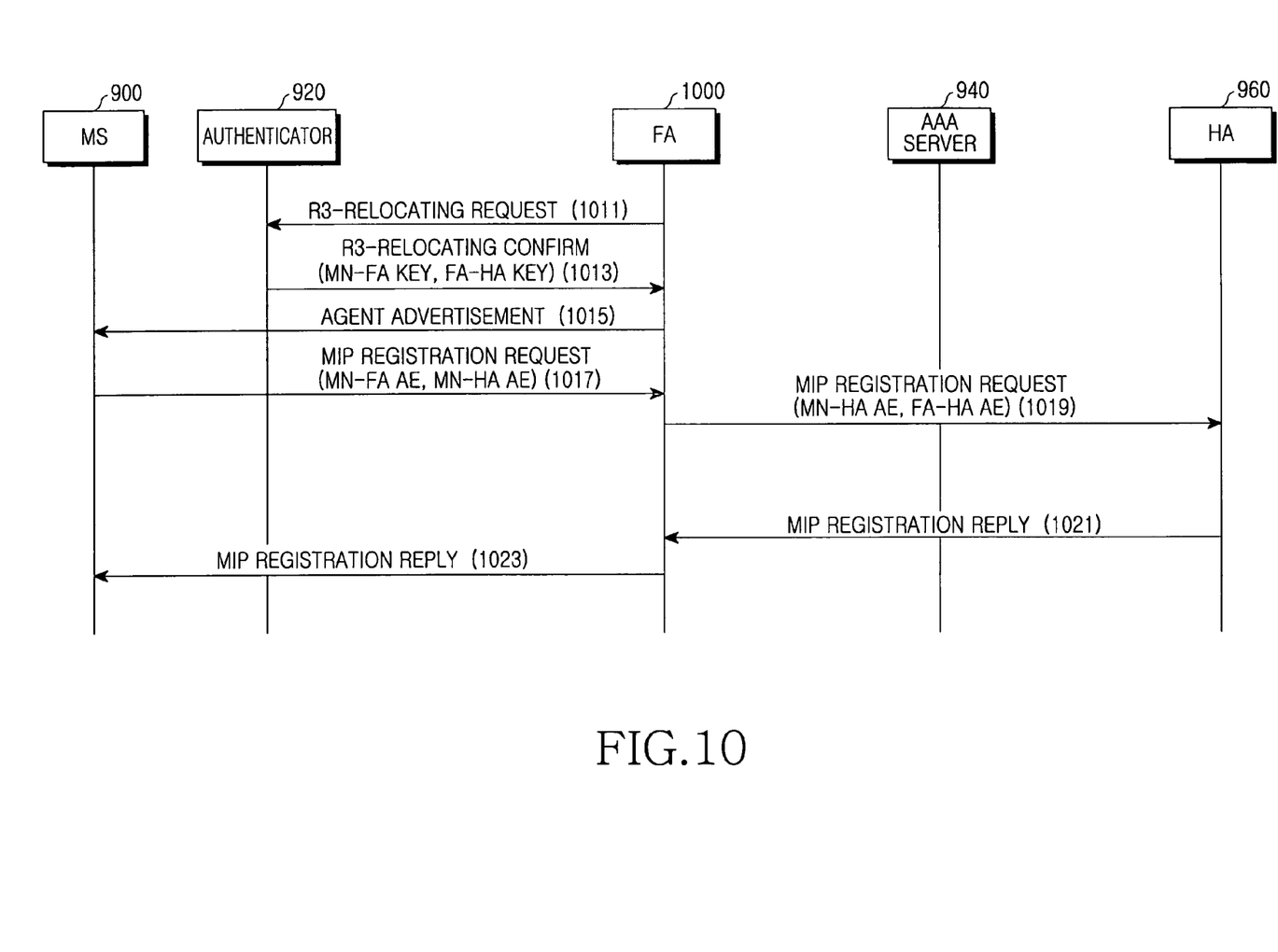
FIG. 10 is a diagram illustrating a signal flow for an authentication procedure in the case where the MS moves out of an FA to which the MS initially accessed by the procedure illustrated in FIG. 9 and enters the service area of another FA.

FIG. 10 is a diagram illustrating a signal flow for an authentication procedure in the case where the MS moves out of an FA to which the MS initially accessed by the procedure illustrated in FIG. 9 and enters the service area of another FA. In the illustrated case of FIG. 10, signaling is performed by RADIUS among the Authenticator 920, an FA 1000, and the AAA server 940, between the AAA server 940 and the HA 960, and between the FA 1000 and the HA 960. For signaling between the MS 900 and the FA 1000, PKMv2 is used.

In FIG. 10, when the MS 900 completes its initial access and then moves from the old FA to which the MS 900 initially accessed to the new FA 1000, the FA 1000 transmits an R3-RELOCATING REQUEST message indicating the change of the location of the MS 900 to the old Authenticator 920 in step 1011. In step 1013, the Authenticator 920 replies to the FA 1000 with an R3-RELOCATING CONFIRM message. The FA 1000 transmits an AGENT ADVERTISEMENT message to the MS 900 in step 1015 and the MS 900 transmits an MIP REGISTRATION REQUEST message with an MN-FA AE and an MN-HA AE to the FA 1000 in step 1017.

In step 1019, the FA 1000 transmits an MIP REGISTRATION REQUEST message to the HA 960. Because the FA 1000 has already received an MN-FA key and an FA-HA key, it does not need to request and receive the MN-FA key and the FA-HA key to the AAA server 940. The HA 960 authenticates the FA-HA AE by creating the FA-HA key using an FA-RK that it manages and transmits an MIP REGISTRATION REPLY message corresponding to the authentication result to the FA 1000 in response to the MIP REGISTRATION REQUEST message in step 1021. In step 1023, the FA 1000 replies to the MS 900 with an MIP REGISTRATION REPLY message for the MIP REGISTRATION REQUEST message received from the MS 900.

As is apparent from the above description, when an MS moves from an initially-accessed FA to a new FA after an initial access, the new FA receives an MN-FA key and an FA-HA key required for authenticating the MS from an old authenticator in PMIPv4 and CMIPv4 communication systems. The resulting minimization of signaling overhead increases overall system performance.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. An authentication method of an authenticator in a communication system, comprising:

receiving from a second Foreign Agent (FA) a location change notification notifying that a Mobile Station (MS) has moved to a service area of the second FA, after the MS completes initial access to a first FA using an Extensible Authentication Protocol (EAP) authentication scheme with an Authorization, Authentication and Accounting (AAA) server in a service area of the first FA; and transmitting a Mobile Node (MN)-FA key and an FA-Home Agent (HA) key of the MS to the second FA in response to the location change notification, the MN-FA and FA-HA keys being generated during the initial access of the MS, wherein the MN-FA key is created based on an FA-Route Key (RK) generated during the initial access of the MS, the FA-RK is created based on a Mobile Internet Protocol (MIP)-RK generated during the initial access of the MS, and the MIP-RK is created based on an Extended Master Session Key (EMSK) generated during the initial access of the MS.

2. The authentication method of claim 1, wherein the MN-FA key is created based on the FA-RK and an Internet Protocol (IP) address of the second FA.

3. The authentication method of claim 2, wherein the FA-RK is created by

FA-RK=$H$(MIP-RK,"FA-RK")

where "FA-RK" denotes a string indicating that a key generated by a function H is the FA-RK and the function H generates the FA-RK for input of the MIP-RK and the string FA-RK as input parameters.

4. The authentication method of claim 1, wherein the communication system complies with a Proxy Mobile Internet Protocol version 4 (PMIPv4) scheme.

5. An authentication method of a second Foreign Agent (FA) in a communication system, comprising:

transmitting a location change notification to an authenticator, upon detection of a Mobile Station (MS)'s movement to a service area of the second FA after the MS completes initial access to a first FA using an Extensible Authentication Protocol (EAP) authentication scheme with an Authorization, Authentication and Accounting (AAA) server in a service area of the first FA; and receiving a Mobile Node (MN)-FA key and an FA-Home Agent (HA) key of the MS from the authenticator, the MN-FA and FA-HA keys being generated during the initial access of the MS, wherein the MN-FA key is created based on an FA-Route Key (RK) generated during the initial access of the MS, the FA-RK is created based on a Mobile Internet Protocol (MIP)-RK generated during the initial access of the MS, and the MIP-RK is created based on an Extended Master Session Key (EMSK) generated during the initial access of the MS.

6. The authentication method of claim 5, wherein the MN-FA key is created based on the FA-RK and an Internet Protocol (IP) address of the first FA.

7. The authentication method of claim 6, wherein the FA-RK is created by $$\text{FA-RK}=H(\text{MIP-RK},\text{"FA-RK"})$$

where "FA-RK" denotes a string indicating that a key generated by a function H is the FA-RK and the function H generates the FA-RK for input of the MIP-RK and the string FA-RK as input parameters.

8. The authentication method of claim 6, further comprising authenticating the MS with an HA of the MS using the MN-FA key.

9. The authentication method of claim 5, wherein the communication system complies with a Proxy Mobile Internet Protocol version 4 (PMIPv4) scheme.

10. An authentication system in a communication system, comprising:

a Mobile Station (MS);

a second Foreign Agent (FA) for transmitting a location change notification to an authenticator, upon detection of the MS's movement to a service area of the second FA after the MS completes initial access to a first FA using an Extensible Authentication Protocol (EAP) authentication scheme with an Authorization, Authentication and Accounting (AAA) server in a service area of the first FA and receiving a Mobile Node (MN)-FA key and an FA-Home Agent (HA) key of the MS from the authenticator, the MN-FA and FA-HA keys being generated during the initial access of the MS; and the authenticator for transmitting the MN-FA key and the FA-HA key in response to the location change notification, wherein the MN-FA key is created based on an FA-Route Key (RK) generated during the initial access of the MS, the FA-RK is created based on a Mobile Internet Protocol (MIP)-RK generated during the initial access of the MS, and the MIP-RK is created based on an Extended Master Session Key (EMSK) generated during the initial access of the MS.

11. The authentication system of claim 10, wherein the MN-FA key is created based on the FA-RK and an Internet Protocol (IP) address of the first FA.

12. The authentication system of claim 11, wherein the FA-RK is created by $$\text{FA-RK}=H(\text{MIP-RK},\text{"FA-RK"})$$

where "FA-RK" denotes a string indicating that a key generated by a function H is the FA-RK and the function H generates the FA-RK for input of the MIP-RK and the string FA-RK as input parameters.

13. The authentication system of claim 11, further comprising an HA of the MS, wherein the second FA authenticates the MS with the HA of the MS using the MN-FA key.

14. The authentication system of claim 10, wherein the communication system complies with a Proxy Mobile Internet Protocol version 4 (PMIPv4) scheme.

* * * * *